United States Patent [19]

Kuxdorf et al.

[11] 4,266,949

[45] May 12, 1981

[54] DEGASSING COLUMN

[75] Inventors: Bernhard Kuxdorf, Brühl; Kurt Wissel, Wesseling-Urfeld; Karl Kaiser, Brühl, all of Fed. Rep. of Germany

[73] Assignee: Hoechst Aktiengesellschaft, Frankfurt am Main, Fed. Rep. of Germany

[21] Appl. No.: 65,190

[22] Filed: Aug. 9, 1979

Related U.S. Application Data

[63] Continuation of Ser. No. 899,321, Apr. 24, 1978, abandoned.

[30] Foreign Application Priority Data

Apr. 28, 1977 [DE] Fed. Rep. of Germany ....... 2718857
Apr. 28, 1977 [DE] Fed. Rep. of Germany ....... 2718858

[51] Int. Cl.³ ........................ B01D 19/00; B01D 3/22
[52] U.S. Cl. ........................ 55/186; 55/196; 202/158; 261/114 TC
[58] Field of Search ............ 55/183, 185–188, 55/196; 202/158; 261/114 R, 114 TC

[56] References Cited

U.S. PATENT DOCUMENTS

| 243,297 | 6/1881 | Perin | 261/114 R |
|---|---|---|---|
| 2,611,596 | 9/1952 | Glitsch | 261/114 R |
| 2,701,028 | 2/1955 | Eilenberger | 261/114 R X |
| 2,747,849 | 5/1956 | Colburn et al. | 261/114 R |
| 2,973,189 | 2/1961 | Chu | 202/158 X |
| 3,649,466 | 3/1972 | Boon et al. | 261/114 R X |
| 3,729,179 | 4/1973 | Keller | 261/114 R |
| 3,958,964 | 5/1976 | Koch | 55/186 |

FOREIGN PATENT DOCUMENTS 1416732 12/1975 United Kingdom ............ 261/114 R

*Primary Examiner*—Robert H. Spitzer
*Attorney, Agent, or Firm*—Connolly and Hutz

[57] ABSTRACT

A degassing column comprising a tubular shell provided with a plurality of apertured plates; the plates are vertically spaced within said shell; a gap uniform in width over the periphery is left between each plate and said shell; each of said plates is penetrated by at least one eccentrically arranged conduit comprising a draining shaft in the upper portion thereof and a feed shaft in the lower portion below the penetrated plate; the apertures in said plates have a diameter of less than 5 mm; and a surface portion of each plate underneath each conduit is impermeable, said impermeable surface portion being one to two times the cross-section of said conduit. More specifically, each plate is supported by a plurality of generally wedge-shaped mountings fastened to the inside of the shell, and by a ring which is level with the said mountings and is fastened to the inside of the shell, the ring being interrupted at least in the regions of the said mountings. A capping sleeve is slipped over each draining shaft. The capping sleeve comprises an upper portion whose cross-section is similar to that of the draining shaft, and a lower portion of larger cross-section, which lower portion overlaps and is securely connected to the upper portion.

6 Claims, 8 Drawing Figures

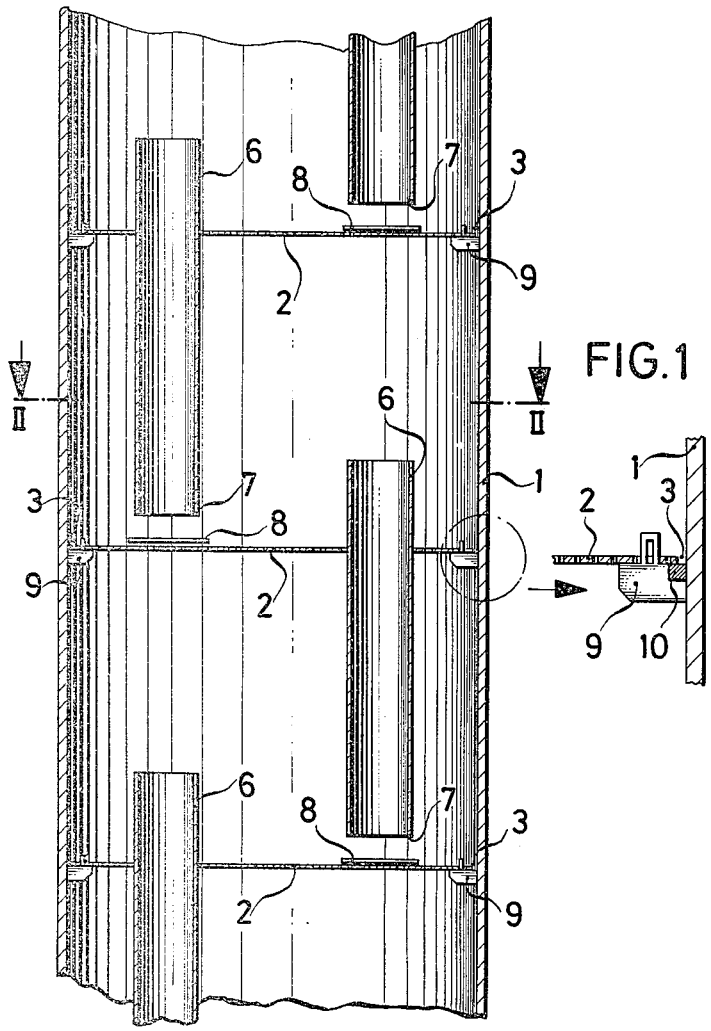
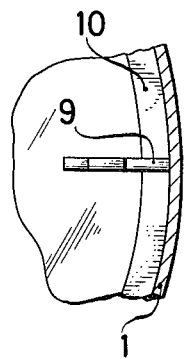
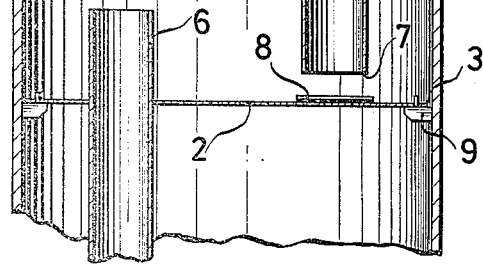
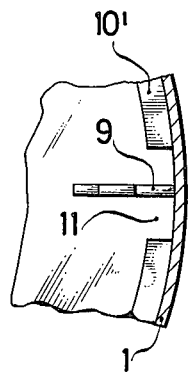
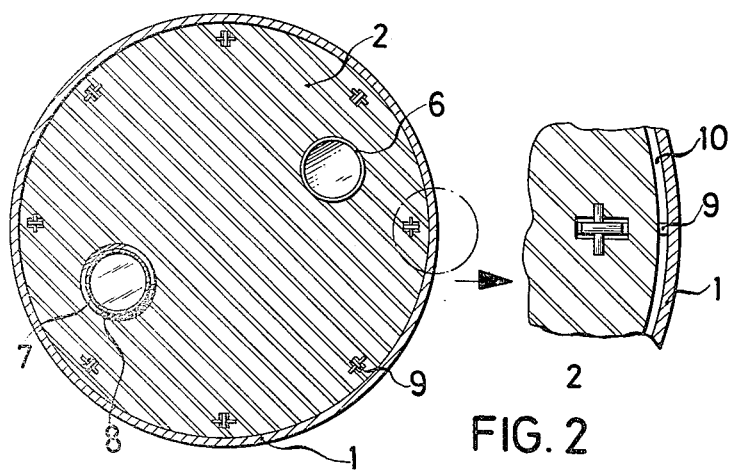

DEGASSING COLUMN

This application is a continuation of U.S. Pat. Ser. No. 899,321, filed Apr. 24, 1978, now abandoned.

This invention relates to a degassing column for removing monomers present in a polymer dispersion comprising a tubular shell provided with a plurality of apertured plates, said plates being vertically spaced within said shell, a small gap uniform in width over the periphery being left between each of said plates and said shell, each of said plates being penetrated by at least one eccentrically arranged conduit comprising a draining shaft in the upper portion thereof and a feed shaft in the lower portion below the penetrated plate, the apertures in said plates having a diameter of less than 5 mm, and a surface portion of each plate underneath each conduit being impermeable, said impermeable surface portion being one to two times the cross-section of said conduit.

It is particularly advantageous for the above-mentioned plates to be supported by generally wedge-shaped mountings which are distributed around the inner wall of the shell and secured thereto, as this enables the entire cross-sectional area of the column extending to the inner wall of the shell to be utilized for the admittance of gas, and enables the deposition of solid material near the said wall to be obviated. Despite this, the generally wedge-shaped mountings do not permit the individual plates which are placed thereon to be as reliably held in position as would be desirable. In those cases in which relatively large quantities of liquid material are admitted to the respective plates which are then naturally subjected to considerable surface loading, the plates are liable to undergo deformation, and, in the end, to become defective, especially in the event of the supply of gas (e.g. steam) to the column being stopped.

In view of the great variety of liquid materials, including in particular polymer dispersions, which may have to be freed from gas or vapour, e.g. vapours of monomers, in a degassing column, and in view of the desirability of an improved degasifying effect, it would be highly desirable to have a degassing column wherein the distance between the upper end of each draining shaft and the respective plate, i.e. the weir height, could be varied.

It is therefore an object of the present invention to provide a degassing column of the type described in which column the plates are not liable to undergo serious deformation or become defective, the cross-sectional area of the shell can be substantially fully utilized for the admittance of gas, and the weir height of the plates can be modified in a simple and inexpensive manner according to the particular polymer dispersion which is to be treated and the degree of degasification which is aimed at.

According to the present invention, we provide a degassing column comprising a tubular shell provided with a plurality of apertured plates; said plates being vertically spaced within said shell; a small gap uniform in width over the periphery being left between each of said plates and said shell; each of said plates being penetrated by at least one eccentrically arranged conduit comprising a draining shaft in the upper portion thereof and a feed shaft in the lower portion below the penetrated plate; the apertures in said plates having a diameter of less than 5 mm; and a surface portion of each plate underneath each conduit being impermeable, said impermeable surface portion being one to two times the cross-section of said conduit; in which degassing column each plate is supported by a plurality of generally wedge-shaped mountings fastened to the inside of the shell, and by a ring which is level with the said mountings and is fastened to the inside of the shell, the ring being interrupted at least in the regions of the said mountings.

The invention also provides for a capping sleeve to be slipped over each draining shaft, the capping sleeves each comprising an upper portion whose cross-section is similar to that of the draining shaft, and a lower portion of larger cross-section, which lower portion overlaps and is securely connected to the upper portion.

Preferred features of the present invention provide:

(a) for a gap to be left free in the direction of the circumference of the column between the said mountings and the respective rings, on both sides of each of the said mountings;

(b) for each of the rings to have a substantially rectangular cross-section;

(c) for each of the rings to have a width of 5 to 20 mm;

(d) for each of the rings to be welded to the inside of the shell;

(e) for each of the capping sleeves to be formed in its lower portion with a plurality of slits distributed around its periphery, in which slits there are engaged respective bolts secured in a radial orientation to the draining shaft;

(f) for the slits each to comprise a lower portion which extends in the axial direction of the capping sleeve and an upper portion which extends transversely with respect thereto;

(g) for the capping sleeves each to have three of the said slits;

(h) for the said bolts to be screw-threaded; and (i) for the capping sleeves to be held in position by means of nuts screw-threadedly engaged on the said bolts.

In a degassing column according to the present invention, it is possible to provide the plates with perforations spaced apart at intervals of 15 mm, for example, so that solid matter is not liable to deposit even if the width over which the rings are supporting the plates is up to 20 mm. Solid matter is also not liable to deposit on the column wall inasmuch as we do not contemplate that the latter should be very effectively heat-insulated, so that a condensate, e.g. water if steam is present within the column, can continually form on the inside of the column shell and can run down in the form of a liquid film producing a washing effect.

As already indicated, we contemplate the provision of plate-supporting rings, in a degassing column according to the present invention, which are fastened, preferably welded, to the inside wall of the shell, so that it is unnecessary for these rings to be supported by any further means.

The impermeable surface on each plate below the respective shaft has an area which is preferably 1 to 2 times the cross-sectional area of the shaft.

In a typical construction in accordance with the invention, the distance between the upper end of each conduit and the respective plate is 80 to 400 mm, and the lower end of each conduit terminates 10 to 100 mm above the plate below it.

Certain embodiments of the present invention are shown diagrammatically in the accompanying drawings, in which:

FIG. 1 is a sectional side-elevational view of a degassing column with a detail on an enlarged scale showing a wedge mounting;

FIG. 2 is a sectional plan view of a plate taken along line II—II of FIG. 1, with a similar detail;

FIG. 3 shows on an enlarged scale the wedge mounting of FIG. 1, the plate being removed;

FIG. 4 shows a modification, also on an enlarged scale, of the wedge mounting of FIG. 2, the plate being removed;

FIG. 4a is a plan view of the draining shaft of FIG. 3a.

Figure 3A:
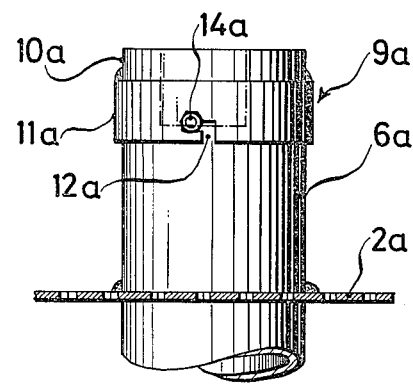
FIG. 3a is a side view of a draining shaft having a cap mounting slipped over it.

As can be seen in FIG. 1, a series of perforated plates 2 which are vertically spaced apart is arranged in a column shell 1, a gap 3 being left between each plate 2 and the column shell 1. An eccentrically arranged conduit 5 serves to provide a feed shaft 7 which terminates above each plate 2; also each plate 2 is penetrated by an eccentrically arranged conduit 6 which serves to provide a draining shaft 6. Positioned below the feed shaft 7 is a covering sheet 8. Each of the plates 2 is supported by a plurality of wedge mountings 9 which are welded to the inside of the column shell 1. Each plate 2 is furthermore carried by a ring 10 having a rectangular cross-section which is welded to the inside of the column shell 1 and which is interrupted, as shown in FIG. 3, in the region of the wedge mountings 9.

In the modification shown in FIG. 4, a gap 11 is left free between each wedge mounting 9 and a ring 10', on both sides of the wedge mounting 9.

Figure 1A:
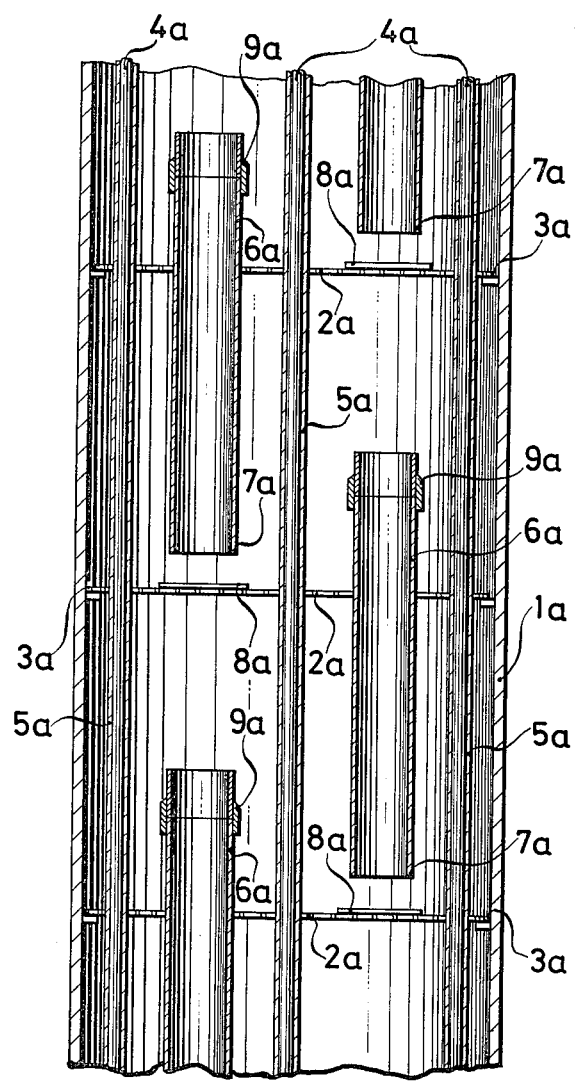
FIG. 1a is a sectional side elevation view of another degassing column.
Figure 2A:
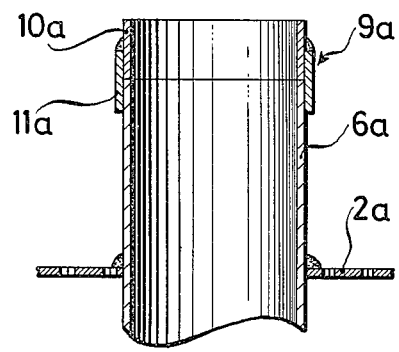
FIG. 2a is a sectional side elevational view of a draining shaft having a cap mounting slipped over it.

In the construction shown in FIG. 1a, a series of perforated plates 2a which are vertically spaced apart is arranged in a column shell 1a, a gap 3a uniform in width around the periphery being left between each plate 2a and the column shell 1a. The plates 2a are penetrated by a plurality of stay bolts 4a, the portion of each stay bolt 4a extending between two adjacent plates 2a being concentrically surrounded by a sleeve 5a, which supports an upper plate 2a, and which supports itself with its lower end on a lower plate 2a. An eccentrically arranged conduit serves to provide a feed shaft 7a which terminates above each plate 2a; also each plate 2a is penetrated by an eccentrically arranged conduit which serves to provide a draining shaft 6a. Positioned below each feed shaft 7a, on the respective plate 2a, is a covering sheet 8. Slipped over each draining shaft 6a is a capping sleeve 9a, which enables the weir height, i.e. the distance between the upper end of the draining shaft 6a (extended by means of the capping sleeve 9a) and the plate 2a, to be readily varied, in accordance with the length of the capping sleeve 9a which is selected. The capping sleeve 9a comprises an upper portion 10a (FIGS. 2a and 3a) of which the cross-section is similar to that of the draining shaft 6a, and a lower portion 11a of larger cross-section, which overlaps the upper portion 10a and is securely connected thereto. The lower portion 11a of the capping sleeve 9a is formed with a plurality of slits 12a (FIG. 3a) which are distributed around its periphery at uniform angular intervals. The slits 12a have a lower portion which extends in the axial direction of the capping sleeve 9a and an upper portion which extends transversely with respect thereto, thus giving a bayonet connection of the capping sleeve 9a to the shaft 6a.

Figure 4A:
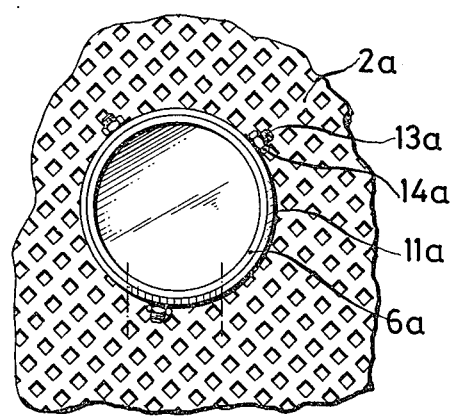

Distributed uniformly around the periphery of the draining shaft 6a and fastened radially thereto is a plurality of threaded bolts 13a (FIG. 4a). The capping sleeve 9a is attached by so presenting it to the shaft 6a that the bolts 13a enter the slits 12a provided in the capping sleeve 9a, and then turning it about the axis of the shaft 6a until it comes to a stop. The capping sleeve 9a is held in position by tightening on to it nuts 14a carried by the bolts 13a.

It is advantageous in this embodiment of the invention to use capping sleeves which permit the weir height to be varied by 20 to 400 mm.

The present degassing column is useful for a variety of applications, e.g. the removal of monomers from polymer dispersions.

We claim:

1. A degassing column for removing monomers from polymers present in dispersions comprising a tubular shell provided with a plurality of apertured plates, the apertures in said plates having a diameter of less than 5 mm, said plates being vertically spaced within said shell; a small gap uniform in width over the periphery being left between each plate and said shell; each of said plates being penetrated by at least one eccentrically arranged circular conduit comprising a draining chute in the upper portion thereof and an intake chute in the lower portion below the penetrated plate with a circular impermeable area on the plate situated below; each plate being supported by a plurality of ring segments and a plurality of wedge mountings, said wedge mountings and ring segments being level with respect to each other; said wedge mountings being fastened at equal distances around the inside of the shell, each of said wedge mountings comprising a flat profile structure in upright position in its middle portion with an upwardly extended projection formed with a slotted opening; each of said ring segments being fastened between two of said wedge mountings to the inside of the shell, said ring segments having a length necessary for them to provide a free peripheral gap between them with respect to said wedge mountings; and each plate being kept in horizontal position by wedges forced through the openings in the projections of each of said wedge mountings whereby minimal contacting surfaces and gassing from all sides are provided and formation of dead spaces, deposits of solids, adhesions of polymerides and clogging are avoided about the wedge mountings in the gap.

2. The column as claimed in claim 1, wherein the ring segments have a substantially rectangular cross-section.

3. The column as claimed in claim 1, wherein each of the ring segments has a width of 5 to 20 mm.

4. The column as claimed in claim 1, wherein each of the ring segments are welded to the inside of the shell.

5. A degassing column for removing monomers from polymers present in dispersions comprising a tubular shell provided with a plurality of apertured plates, the apertures in said plates having a diameter of less than 5 mm, said plates being vertically spaced within said shell; a small gap uniform in width over its periphery being left between each plate and said shell; each of said plates being penetrated by at least one eccentrically arranged circular conduit comprising a draining chute in the upper portion thereof and an intake chute in the lower portion below the penetrated plate with a circular impermeable area on the plate situated below, a capping sleeve disposed over each draining chute; said capping sleeve comprising an upper portion and a lower portion securely connected to one another, said upper portion having a cross-section similar to that of the draining chute and said lower portion having a cross-section larger than that of said upper portion, the lower portion of said capping sleeve overlapping the upper portion thereof and being formed with a plurality of rectangularly shaped slots distributed around its periphery, said slots' lower portions being extended in axial direction of said capping sleeve and said slots' upper portions being extended transversely thereto whereby only one contacting surface is provided between the lower portion of the capping sleeve and the draining chute and whereby the possibility of having solids accumulate or polymerides adhere is considerably reduced; each draining chute being provided with number of screw-threaded bolts equal to the number of slots being formed in said capping sleeve, said bolts being secured in a radial orientation of the surface area of each draining chute so as to engage with said slots; and said capping sleeve being held in position by means of nuts screw-threadedly engaged on said bolts.

6. The column as claimed in claim 5, wherein the capping sleeve is formed with three slots.

* * * * *